3,128,273
4-AMINO-PTERIDINE-7-CARBOXAMIDES AND METHOD OF PREPARATION
Irwin J. Pachter, Erdenheim, and Joseph Weinstock, Phoenixville, Pa., assignors to Smith Kline & French Laboratories, Philadelphia, Pa., a corporation of Pennsylvania
No Drawing. Filed Apr. 26, 1962, Ser. No. 190,213
9 Claims. (Cl. 260—251.5)

This invention pertains to novel processes for the preparation of new and valuable organic compounds. In particular, this invention relates to a process for the preparation of 2,6-disubstituted-4-amino-7-carboxyamidopteridine compounds and to these compounds themselves.

These compounds possess diuretic and hypotensive activity and are accordingly useful in the management of certain conditions manifested by edema and/or hypertension. Furthermore, as discussed more fully hereafter, certain of these compounds are useful as intermediates in the preparation of other valuable pteridine compounds.

The compounds of this invention are represented by the formula:

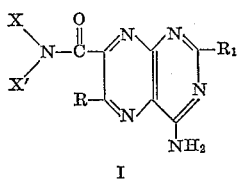

I wherein R is an aryl, lower alkyl or lower aralkyl group, $R_1$ is an aryl or amino group, and each of X and X' is hydrogen, lower alkyl, aryl, aralkyl or when taken together, alkylene of from 4 to 5 carbon atoms. Unless otherwise defined, the term "lower alkyl" includes straight or branch hydrocarbon chains of up to about 5 carbon atoms. The derived terms of alkyl such as lower alkanoic and aralkyl refer to corresponding groups containing such hydrocarbon chains.

According to the process of this invention, a polyaminopyrimidine (II) is treated with a diketo oxime (III) in an aqueous solvent so as to form the desired 4-amino-7-carboxyamidopteridine (IV).

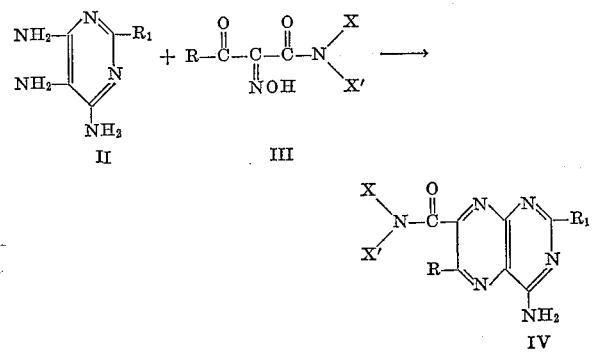

II    III

IV

Although a variety of water miscible organic solvents, as for example the lower alkanols or aqueous mixtures thereof, are operative in this reaction, it has been found that use of water itself is a simple and practical expedient. The reactants are accordingly heated at reflux in such an aqueous medium for a period of from about ten to about thirty hours. Upon completion of the reaction, substantial separation of the product occurs upon cooling. Some additional material however may be further obtained from the mother liquor by the usual isolation procedures; e.g., concentration or cooling.

The requisite diketo oxime (III) is prepared from an appropriately substituted carboxyacetamide by treatment with a source of nitrite ions. A particularly useful system in this regard is an alkali metal nitrite in a lower alkanoic acid, as for example sodium nitrite in acetic acid. The reaction is preferably executed at temperatures below 10° C. and the product may be readily isolated by dilution of the reaction mixture with water. This reaction may be represented as follows:

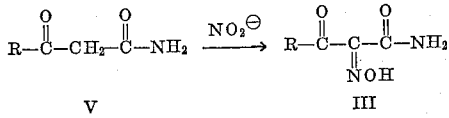

V    III

The 4-amino-7-carboxyamidopteridines (IV), wherein both X and X' represent hydrogen, not only demonstrate a high degree of diuretic activity in their own right, but furthermore represent a particularly valuable class of intermediates in that they themselves can be converted into valuable known diuretic compounds. Thus for example, treatment with an aqueous source of hypobromite ion, as for example a solution of potassium hypobromite, converts the 7-carboxyamide group to an amino group.

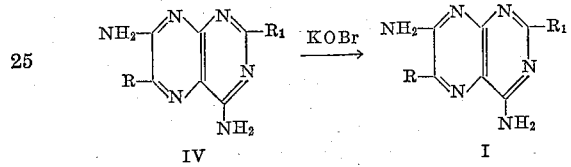

IV    I

The various therapeutically active compounds described herein may be administered via any of the usual routes but are preferably administered orally. For such use, they may be utilized in the form of capsules, tablets, powders and the like, either alone or compounded in combination with other suitable therapeutic agents.

It is to be appreciated that the above procedures and conditions may be varied within the area of obvious chemical equivalents without departing from the fundamental nature of our invention. The following examples are therefore only representative of further exemplification for this invention and are not to be construed as a limitation thereof.

*Example 1*

To a solution of 5.0 g. of benzoylacetamide in 16 ml. of glacial acetic acid is added in a dropwise fashion, a solution of sodium nitrite (2,3 g.) in 4 ml. of water. The mixture is stirred below 10° C. during addition and then for one-half hour after addition. The mixture is diluted with 30 ml. of ice-water and allowed to stand with cooling for three hours, thus forming the product, α-isonitrosobenzoylacetamide which upon collection by filtration and recrystallization from alcohol exhibits a melting point of 148–149° C.

*Example 2*

A mixture of 4.0 g. of α-isonitrosobenzoylacetamide and 4.2 g. of 2-phenyl-4,5,6-triaminopyrimidine in 200 ml. of water is refluxed for 24 hours. At the end of this time, the solution is allowed to cool and the solid which forms collected by filtration. Additional material may be obtained from the filtrate by allowing it to stand for a period of time. The solids thus collected are recrystallized from dimethylformamide to yield the product 2,6-diphenyl-4-amino-7-carboxamidopteridine, M.P. 308–309° C.

*Example 3*

To an ice-cold solution of 8.7 g. of potassium hydroxide in 75 ml. of water are added 4.1 g. of bromine in 40 ml. of water. The resultant solution of potassium hypobromite is then employed to treat 8.8 g. of 2,6-diphenyl-4-amino-7-carboxamidopteridine in 50 ml. of dimethylformamide. The mixture is warmed to 50° and then allowed to stand at room temperature for two hours. At the end of this time, the mixture is heated on a steam bath for one hour, cooled, and filtered to separate the solid. This solid is then extracted with boiling dilute hydrochloric acid and the acidic extracts so obtained are then neutralized with ammonium. Recrystallization from dimethylformamide of the solid thus formed then yeilds 2,6-diphenyl-4,7-diaminopteridine, M.P. over 350°.

*Example 4*

Following the procedure of Example 2, 2,4,5,6-tetraminopyrimidine is substituted for 2-phenyl-4,5,6-triaminopyrimidine, and upon completion of the steps therein described, there is obtained the compound 2,4-diamino-6-phenyl-7-carboxamidopteridine which when treated with potassium hypobromite (according to the procedure of Example 3), yields 2,4,7-triamino-6-phenylpteridine.

*Example 5*

Dry hydrogen chloride gas is passed into a cooled solution of 54.5 g. to 3-thiophenecarbonitrile in 75 ml. of absolute ethanol and the resulting solution allowed to stand for 48 hours. There is then added in several portions an 8% solution of dry ammonium in absolute ethanol (containing 12 g. of ammonia). The mixture is then shaken for 24 hours, allowed to stand for 48 hours and finally filtered. The resultant filtrate is evaporated to dryness and the residue dissolved in water. This aqueous solution is acidified with concentrated hydrochloric acid, clarified with carbon, filtered and concentrated. The solid which forms is isolated by filtration to yield 3-thiophenecarboxamidine hydrochloride.

To a solution of 8.1 g. of 3-thiophenecarboxamidine hydrochloride in 80 ml. of methanol are added 11.1 g. of the silver salt of isonitrosomalononitrile. The resulting solution is stirred for 30 minutes and filtered, the filtrate then being evaporated to dryness in vacuo. The residue is refluxed with 50 ml. of 5-ethyl-2-methylpyridine for 20 minutes, at the end of which time it is cooled, diluted with 100 ml. of ethanol and filtered to yield 2-(3-thienyl)-4,6-diamino-5-nitrosopyrimidine which is reduced with sodium hydrosulfate to yield 2-(3-thienyl)-4,5,6-triaminopyrimidine. Substitution of this compound for 2-phenyl-4,5,6-triaminopyrimidine in the process of Example 2 then yields the product 2-(3-thienyl)-6-phenyl-4-amino-7-carboxamidopteridine which upon treatment with hypobromite according to the procedure of Example 3 yields 2-(3-thienyl)-6-phenyl-4,7-diaminopteridine.

*Exampe 6*

To 10 ml. of thionyl chloride are added 2.5 g. of 3-oxo-3-(2-thienyl)-propionic acid. The mixture is allowed to stand for 15 hours at room temperature and the resultant solution evaporated in vacuo at 35° C. The oil so obtained is dissolved in 35 ml. of benzene and the resultant mixture then evaporated. This mixture is then held in vacuo to remove any traces of thionyl chloride and the resultant mixture distilled to yield 3-oxo-3-(2-thienyl)-propionic acid chloride which is shaken with an aqueous solution of ammonium, extracted with ether, and evaporated to yield 3-oxo-3-(2-thienyl)-propionamide.

This compound is then substituted for benzoylacetamide in the procedure of Example 1 and the product thus obtained employed in the procedure of Example 2 to yield 2 - phenyl-6-(2-thienyl)-4-amino-7-carboxamidopteridine which is converted to 2-phenyl-6-(2-thienyl)-4,7-diaminopteridine by treatment with potassium hypobromite according to Example 3.

Similarly, by treating 3-oxopentanoic acid with thionyl chloride according to the procedure described in this example, there is obtained the corresponding acid chloride which is converted to propionylacetamide by treatment with ammonium. By substituting this compound in the procedure of Example 1 and thereafter executing the analogous procedure of Example 2 and 3 respectively, there is obtained the compound 2-phenyl-4,7-diamino-6-ethylpteridine.

*Example 7*

Acetobenzylacetamide is substituted for benzoylacetamide in the procedure of Example 1 and the resultant α-isonitroso compound then utilized according to Example 2. There is thus obtained the compound 2-phenyl-4-amino-6-methyl-7N-benzylcarboxyamidopteridine.

Similarly from acetoacetopiperidide there is obtained 2 - phenyl-4-amino-6-methyl-7-carboxypiperididopteridine. In a like manner N,N-dimethylbenzoylacetamide may be employed to yield 2,6-diphenyl-4-amino-7-dimethylcarboxyamidopteridine.

What is claimed is:

1. the process for the preparation of compounds of the formula:

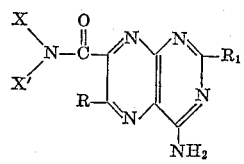

wherein:

R is a member selected from the group consisting of phenyl, thienyl and lower alkyl;

$R_1$ is a member selected from the group consisting of phenyl, thienyl and amino;

X and X' are each members selected from the group consisting of hydrogen, phenyl, phenyl lower alkyl, lower alkyl and taken together, alkylene of from 4 to 5 carbon atoms; which comprise:

(a) treating a compound of the formula:

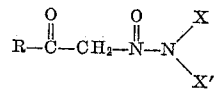

with sodium nitrite in a lower alkanoic acid so as to form an oxime of the formula:

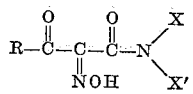

and (b) heating an aqueous mixture of said oxime with a 4,5,6-triaminopyrimidine of the structure:

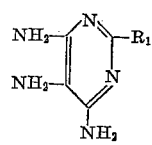

2. The process according to claim 1 including the step of treating a compound of the formula:

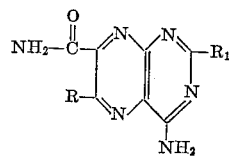

with an aqueous source of hypobromite ion so as to form a 4,6-diaminopteridine of the formula:

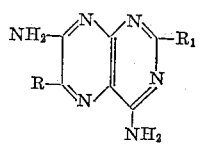

wherein R and $R_1$ are as therein defined.

3. The process according to claim 1 wherein R is phenyl and $R_1$ is amino.

4. The process according to claim 1 wherein R and $R_1$ are phenyl.

5. The process according to claim 2 wherein R is phenyl and $R_1$ is amino.

6. The process according to claim 2 wherein R and $R_1$ are phenyl.

7. A compound having the structure:

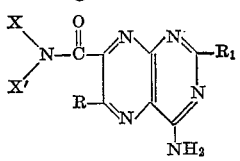

wherein:
R is a member selected from the group consisting of phenyl, thienyl and lower alkyl;
$R_1$ is a member selected from the group consisting of phenyl, thienyl and amino;
X and X' are each members selected from the group consisting of hydrogen, phenyl, phenyl lower alkyl, lower alkyl and taken together, alkylene of from 4 to 5 carbon atoms.

8. 2,6-diphenyl-4-amino-7-carboxyamidopteridine.

9. 2,4-diamino-6-phenyl-7-carboxyamidopteridine.

References Cited in the file of this patent

UNITED STATES PATENTS

| | | |
|---|---|---|
| 2,667,486 | Cain | Jan. 26, 1954 |
| 2,940,972 | Roch | June 14, 1960 |
| 2,975,180 | Osdene | Mar. 14, 1961 |

OTHER REFERENCES

Spickett et al.: J. Chem. Soc. (London), 1954, pages 2887–95.

Masuda et al.: Chem. Pharm. Bull. (Tokyo), vol. 6 (1958), pages 291–9.